(12) United States Patent
Jakab et al.

(10) Patent No.: US 9,035,967 B2
(45) Date of Patent: May 19, 2015

(54) METHOD AND DEVICE FOR ENHANCING SCROLLING AND OTHER OPERATIONS ON A DISPLAY

(75) Inventors: Michael T. Jakab, Oakland, CA (US); Jessica L. Call, Chicago, IL (US); Ho Kee Law, San Jose, CA (US); Daniel C. Wong, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 363 days.

(21) Appl. No.: 13/173,821

(22) Filed: Jun. 30, 2011

(65) Prior Publication Data

US 2013/0002707 A1   Jan. 3, 2013

(51) Int. Cl.
| | | |
|---|---|---|
| G09G 5/00 | (2006.01) | |
| G06F 3/048 | (2013.01) | |
| G06F 3/0485 | (2013.01) | |
| G09G 5/34 | (2006.01) | |

(52) U.S. Cl.
CPC ............... G06F 3/0485 (2013.01); G09G 5/34 (2013.01); *G09G 2340/145* (2013.01)

(58) Field of Classification Search
None
See application file for complete search history.

(56) References Cited

U.S. PATENT DOCUMENTS

| | | |
|---|---|---|
| 4,491,933 A | 1/1985 | Ursin et al. |
| 5,317,306 A | 5/1994 | Abraham et al. |
| 5,528,259 A | 6/1996 | Bates et al. |
| 5,548,702 A | 8/1996 | Li et al. |
| 5,553,223 A | 9/1996 | Greenlee et al. |
| 5,621,906 A | 4/1997 | O'Neill et al. |
| 5,677,708 A | 10/1997 | Matthews et al. |
| 5,740,389 A | 4/1998 | Li et al. |
| 5,872,566 A | 2/1999 | Bates et al. |
| 5,877,760 A | 3/1999 | Onda et al. |
| 5,923,328 A | 7/1999 | Griesmer |
| 5,943,051 A | 8/1999 | Onda et al. |
| 5,953,005 A | 9/1999 | Liu |
| 5,978,818 A | 11/1999 | Lin |
| 6,061,063 A | 5/2000 | Wagner et al. |

(Continued)

FOREIGN PATENT DOCUMENTS

KR    1020090063449 A    6/2009

OTHER PUBLICATIONS

Petzold "The Ins and OUts of ItemsControl", downloaded from http://web.archive.org/web/20100911212740/http://msdn.microsoft.com/en-us/magazine/ff714594.aspx available online since Sep. 11, 2010.*

(Continued)

*Primary Examiner* — Xiao M. Wu
*Assistant Examiner* — Yingchun He
(74) *Attorney, Agent, or Firm* — Shumaker & Sieffert, P.A.

(57) ABSTRACT

A method (1500) and electronic device (100) for enhancing scrolling operations along a display (101) is disclosed. The method (1500) includes detecting (1501) that an event has occurred, altering (1502) the presentation of data elements (601,602) by introducing visible spatial separation (603) between the adjacent data elements (601,602) in response to detecting (1501) the event. Once the event has occurred, the spatial separation (603) can be removed. Where the event is reaching the end (701) of a list (502) in a scrolling operation, the method (1500) can include determining the list (502) is reaching the end (701) during the scrolling operation, introducing visible spatial separation (603), and removing the visible spatial separation (603) after the end (701) of the list (502) is reached.

18 Claims, 10 Drawing Sheets

(56) References Cited

U.S. PATENT DOCUMENTS

| | | | |
|---|---|---|---|
| 6,128,012 A | 10/2000 | Seidensticker et al. | |
| 6,147,670 A | 11/2000 | Rossmann | |
| 6,209,009 B1 | 3/2001 | Schwartz et al. | |
| 6,278,455 B1 | 8/2001 | Baker | |
| 6,288,718 B1 | 9/2001 | Laursen et al. | |
| 6,300,967 B1 | 10/2001 | Wagner et al. | |
| 6,369,837 B1 | 4/2002 | Schirmer | |
| 6,486,896 B1 | 11/2002 | Ubillos | |
| 6,532,001 B1 | 3/2003 | Taraki et al. | |
| 6,690,387 B2 | 2/2004 | Zimmerman et al. | |
| 6,952,220 B1 | 10/2005 | Rossmann | |
| 7,184,064 B2 | 2/2007 | Zimmerman et al. | |
| 7,447,987 B2 | 11/2008 | Sauermann | |
| 7,458,035 B2 | 11/2008 | Lindemann | |
| 7,469,381 B2 | 12/2008 | Ording | |
| 7,564,467 B2 | 7/2009 | Haneda et al. | |
| 7,786,975 B2 | 8/2010 | Ording et al. | |
| 2008/0052945 A1* | 3/2008 | Matas et al. | 34/173 |
| 2008/0168384 A1 | 7/2008 | Platzer et al. | |
| 2008/0168478 A1 | 7/2008 | Platzer et al. | |
| 2009/0100373 A1* | 4/2009 | Pixley et al. | 715/786 |
| 2009/0183120 A1* | 7/2009 | Ording et al. | 715/823 |
| 2009/0228825 A1 | 9/2009 | VanOs et al. | |
| 2009/0288035 A1* | 11/2009 | Tunning et al. | 715/784 |
| 2010/0162306 A1 | 6/2010 | Craner | |
| 2010/0202859 A1* | 8/2010 | Smith | 414/11 |
| 2010/0283743 A1 | 11/2010 | Coddington | |
| 2011/0069017 A1 | 3/2011 | Victor | |
| 2011/0090255 A1 | 4/2011 | Wilson et al. | |
| 2011/0107264 A1 | 5/2011 | Akella | |
| 2011/0202859 A1* | 8/2011 | Fong | 715/769 |
| 2012/0278754 A1* | 11/2012 | Lehmann et al. | 715/784 |

OTHER PUBLICATIONS

United States Patent and Trademark Office, "Final Rejection" for U.S. Appl. No. 12/609,420 dated Aug. 30, 2012, 20 pages.

United States Patent and Trademark Office, "Non-Final Rejection" for U.S. Appl. No. 12/609,420 dated Mar. 16, 2012, 18 pages.

United States Patent and Trademark Office, "Non-Final Rejection", U.S Appl. No. 12/609,420, Oct. 31, 2011, 25 pages.

United States Patent and Trademark Office, "Final Rejection" for U.S. Appl. No. 12/609,420 dated Sep. 11, 2012, 20 pages.

* cited by examiner

METHOD AND DEVICE FOR ENHANCING SCROLLING AND OTHER OPERATIONS ON A DISPLAY

BACKGROUND

1. Technical Field

This invention relates generally to the presentation of data elements on a display, and more particularly to a method of enhancing the presentation of data elements during scrolling and other operations.

2. Background Art

Portable electronic devices, such as mobile telephones, media devices, gaming devices, and personal digital assistants, are becoming increasingly sophisticated. Such mobile communication devices are becoming, more and more, an integral part of the business and personal lives of their users. Advances in memory capacity have led to mobile communication devices that can store hundreds of thousands of data elements. By way of example, some portable electronic devices like phones and multimedia players are capable of storing hundreds of music and video files. Similarly, the contents of an entire business card file can easily be stored as an address book list in many mobile telephones. These address book lists are capable of easily storing hundreds or even thousands of entries.

One problem associated with all of this data involves manipulating the presentation of data as a list on the display. Many portable electronic devices today are small, handheld units. As such, the space on the device for displays is limited. While a particular device may be capable of storing thousands of addresses, it may be capable of presenting only ten to fifteen on the display at any one given time. While users are often permitted to scroll through the list, when there are hundreds of entries, it can be difficult to know where within a list the user is at any given time.

It would be beneficial to have an improved method and apparatus that enables enhanced scrolling or other manipulation of the presentation of data in an electronic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to manipulation of data elements on a display of a device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of enhanced scrolling and other operations of data element manipulation as described herein. As such, these functions may be interpreted as steps of a method to perform enhanced scrolling and data element manipulation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Display devices have evolved to provide scrolling functionality in order to facilitate the display of data elements where the set of data elements is too large to be shown on the display area in its entirety. Scrolling allows different portions of a list to be displayed as directed by user input. The user input can be provided using a scrollbar, arrow keys on a keyboard, scroll wheel, rocker switch, five-way navigation button, or the like. The user may scroll through a list, grid, or set of icons by various increments, including line-by-line increments, page-by-page increments, or item-by-item increments, etc.

It can be advantageous for a user to know that the list is reaching or has reached the beginning or the end of the list. Additionally, it can be advantageous for a user to know that a data manipulation process, such as the addition of a data element, is occurring. Various prior art visual indicators have been devised in an attempt to provide users with an indication as to the position, or context, of a list of data elements. One common approach is to provide a scroll bar on the side of a list with a position indicator. The problem with such prior art approaches is that the scroll bars are typically provided in a right-side border of the display. In this position, it can be difficult for a user to notice the position indicator, which is a problem that is compounded in a small mobile device with reduced display area. Moreover, a user is typically focused on the content of the list and is not likely to pay attention to a scroll bar position indicator. Another problem with position indicators is that they are not suitable for indicating the occurrence of other events, such as the addition of a new data element.

Embodiments of the present invention provide methods and apparatuses for altering the presentation of data elements on a display of an electronic device. The data elements can be presented in a variety of formats, including as a traditional list, in a grid, as adjacent icons, and so forth. When a predefined operation occurs, embodiments of the present invention alter the presentation of a plurality of data elements being presented on the display by introducing a visible spatial separation between at least some of the data elements in response to the event occurring. The visible spatial separation serves as a visible clue that an event is occurring. The visible spatial separation can be used for a variety of events, including scrolling operations and other operations, such as the addition of a new data element noted above.

For example, in one embodiment the "event" is the occurrence of an end of list condition. Said differently, when a user is scrolling through a list for example, and the list nears its end in a given direction, methods described herein are configured to detect the scrolling operation, determine the list is reaching an end of the scrolling operation, and to introduce visible spatial separation between at least some adjacent data elements in response to determining the list is reaching an end. Once the end of the list is reached, the spatial variation can be removed, thereby returning the data elements to a condition of adjacency.

In another embodiment, the "event" can be a different type of operation. One example would be the addition of a new contact in a list of contacts. When a user initiates a contact addition operation, embodiments described herein can be configured to alter the presentation of the data elements by introducing a visible spatial separation between the data element being added and other data elements being presented on the display. Once the data element has been added, embodiments described herein can remove the visible spatial separation after the event occurs. Other examples of events include rotation of a device, presentation of a virtual keyboard on a display, and so forth.

In one embodiment, the visible spatial separation is introduced by an animation of the data elements. Said differently, in one embodiment, a list animation is triggered by detection of a predefined event. Where the event is scrolling, and when the scrolling of the list reaches the end of the list, an animation can be actuated that affects the presentation of the elements of the list. In one embodiment, the animation is a "list separation effect" that causes each list item to have a different speed of moving away from the end of the list direction. Each list item thus has a separation while moving away from the end of the list. The speed and separation can be linear, or can correspond to a predetermined function in time.

Figure 1:
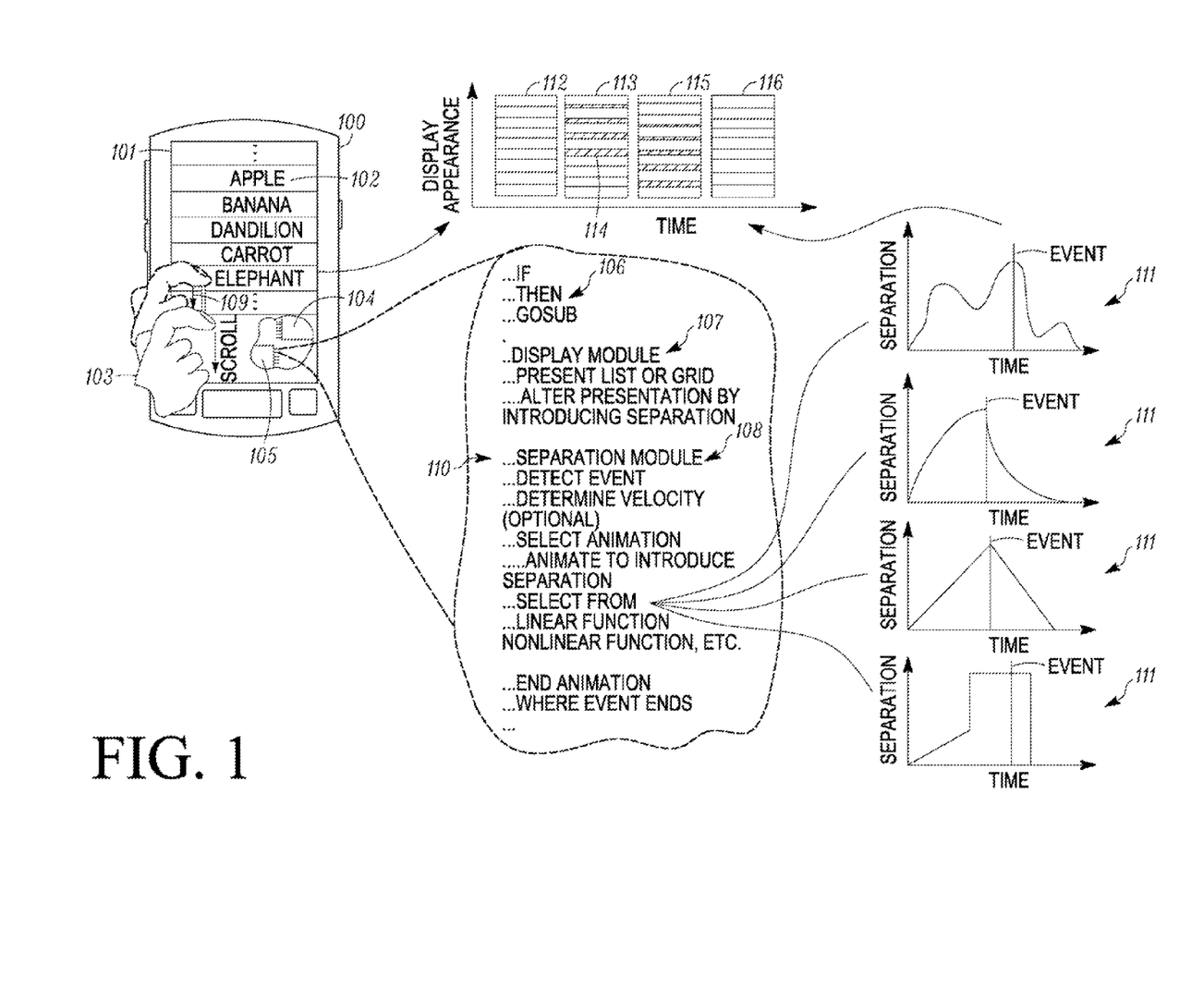
FIG. 1 illustrates a device operational in a system configured to enhance scrolling and other data element manipulation operations, each configured in accordance with one or more embodiments of the invention.

Turning now to FIG. 1, illustrated therein is a portable electronic device 100 having a display and a user interface. In the illustrative embodiment of FIG. 1, the display and user interface are integrated together as a touch sensitive display 101. While a touch sensitive display 101 combining a user input interface and display suitable for use with embodiments of the invention, it will be clear to those of ordinary skill in the art having the benefit of this disclosure that the invention is not so limited. For example, an electronic device having a separate user interface and display is shown below in FIGS. 12 and 13. In addition to touch sensitive user interfaces, non-touch sensitive user interfaces including a mouse, joystick as shown in FIG. 14, optical mouse, or other device can also be used in accordance with embodiments of the invention. The exemplary electronic device 100 can be any of a number of devices, including a mobile telephone, a gaming device, a multimedia player, a personal digital assistant, a portable or other computer, and so forth.

In the illustrative embodiment of FIG. 1, the touch sensitive display 101 is configured to receive input from a user 103. The touch sensitive display is also configured to present data elements 102 to a user 103. The presentation of data elements 102 can take many forms, including a list configuration, grid configuration, iconic configuration, user defined configuration, or other configuration. Additionally, the data elements 102 can take many forms. Examples include address book entries, file names, music titles, file names, images, or other information. Other examples of data elements 102 include lists of data elements, thumbnails of images stored in memory, icons representing videos stored in memory, and so forth. This exemplary data is not exclusive, as other types of data may be presented as well.

A control circuit 104, which may be a microcontroller, a microprocessor, ASIC, logic chip, or other device, serves as the brain of the electronic device 100. The control circuit 104 can include other processing units dedicated to performance of specific functions. For example, an integrated or stand-alone digital signal processor may handle the processing of incoming communication signals or data. In the illustrative embodiment of FIG. 1, the control circuit 104 is illustrated for simplicity as an integrated circuit, but shall be understood to be representative of any processing architecture known to those skilled in the art. The control circuit 104, which can be a single processor, such as a microprocessor integrated circuit, or alternatively may comprise one or more processing units or components, is coupled to the memory 105 or other computer readable medium. By executing operable code 106 stored in the memory 105, the control circuit 104 performs the various functions of the device.

In one embodiment, the control circuit 104 executes code 106 comprising one or more routines stored either in the memory 105, which may comprise one or more memories. The memory 105 may comprise a separate and distinct integrated circuit connected and operable with the control circuit via a data bus. The memory 105 may include one or more read-only memories, dynamic or static random-access memory, or any other type of programmable memory, such as one or more EPROMs, EEPROMs, registers, and the like. In some embodiments, the memory 105 can comprise non-traditional storage devices, such as a SIM, USIM, R-UIM, NVM, etc. The routines stored in the memory 105 can be stored in the form of executable software, firmware, or in any other fashion known to those skilled in the art.

In addition to the executable code 106 operable with the control circuit 104, the memory 105 may further store other information. For instance, as will be described in more detail below, the memory 105 can include predetermined function data, such as one or more temporal functions 111 in accordance with which the visible spatial separation described herein can be introduced and/or removed. Additionally, the memory 105 can store predetermined visible separation data, such distances or measurements of the visible spatial separation that is to be introduced between adjacent data elements.

In one embodiment, the executable code 106 stored within the memory 105 can be configured as modules. The various modules can be configured as logic in hardware as well. In one embodiment, these modules include a display module 107 and a separation module 108.

The display module 107 is configured to present data elements on the display 101 and, in one embodiment, introduce visible spatial separation between adjacent data elements in accordance with guidance from the separation module 108. The separation module 108 is configured to detect the occurrence of an event, select an animation configured to introduce visible spatial separation between data elements, and then cause the spatial to be removed after the event occurs. In one embodiment the animation for altering spatial separation between data elements 102 comprises initiating an animation configured to move the at least some of the data elements 102 from being adjacent to being separated by a peak extension length across a predefined time leading to the event occurring.

In one or more embodiments the executable code 106 stored within the memory 105 can be configured to optionally determine velocity or acceleration of a scrolling operation 109. Said differently, a velocity module 110 can be configured to measure an intensity of the scrolling operation 109 and to alter the visible spatial separation based upon the determined intensity. For example, the visible spatial separation can be proportional to the detected intensity such that a larger intensity results in more visible spatial separation appearing between the data elements. In one illustrative embodiment, intensity of the scrolling operation 109 is measured in terms of velocity and acceleration. For example, when the scrolling operation 109 is measured to have a speed of 'x' meters/second, the peak length of the introduced visible spatial separation can be, as an illustrative example, X millimeters. When the scrolling operation 109 is measured to have a speed of 'y' meters/second, where 'y' is less than 'x,' the peak length of introduced visible spatial separation can be less than X millimeters.

Illustrating operation by way of a scrolling example, a list of data elements 102 is initially present on display 101 of the electronic device. Such a list is shown in display snapshot 112. A user 103 then initiates a scrolling operation 109. The separation module 108 is configured to detect the scrolling operation 109.

The separation module is further configured to determine when the list of data elements 102 is reaching an end, be it at the top or bottom of the list. When this occurs, the separation module 108 is configured to introduce visible spatial separation 114 between at least some of the adjacent data elements 102 in response to determining the list is reaching the end. This is shown illustratively in display snapshot 113, where five of the uppermost data elements are separated by four visible spatial separation elements.

In one or more embodiments, the introduced visible spatial separation differs between different pairs of adjacent data elements. For example, the introduced visible spatial separation between the at least some adjacent data elements in an end of list event can depend upon a data element position in the list relative to the end of the list. In illustrative display snapshot 113, the visible spatial separation is "descending" in that each visible spatial separation element gets larger in accordance with its distance from the end of the list. Said differently, when the visible spatial separation is descending, the visible spatial separation between data elements is larger for data elements farther from the end of the list than for other data elements closer to the end of the list. It will be clear to those of ordinary skill in the art having the benefit of this disclosure that this is but one example of how the visible spatial separation can be configured. The length of each visible spatial separation element could be configured in an ascending arrangement, a substantially equal arrangement, or random arrangement. The differences in visible spatial separation lengths can also be determined in accordance with a predetermined separation function or look-up table. Predetermined separation function can be linear, non-linear, piecewise linear, and so forth.

Display snapshot 115 shows the list at its end. As can be seen, the visible spatial separation elements are now seven in number, arranged in a descending relationship. Once the event has occurred, i.e., once the list end is reached in this example, the separation module 118 is configured to remove the visible spatial separation. This is shown in display snapshot 116, where the data elements 102 are again adjacent to each other.

The introduction and removal of the visible spatial separation elements can occur in accordance with a function of time. In FIG. 1, the illustrative visible spatial separation is introduced and removed in accordance with a half sine wave, thereby giving the data elements the appearance of stretching and contraction like a spring. However, this is but one example. Any number of temporal functions 111 can be used to determine how the separation is introduced. Linear functions, non-linear functions, and so forth can give rise to ripple effects, snap-back effects, or other aesthetically pleasing enhancements.

Figure 2:
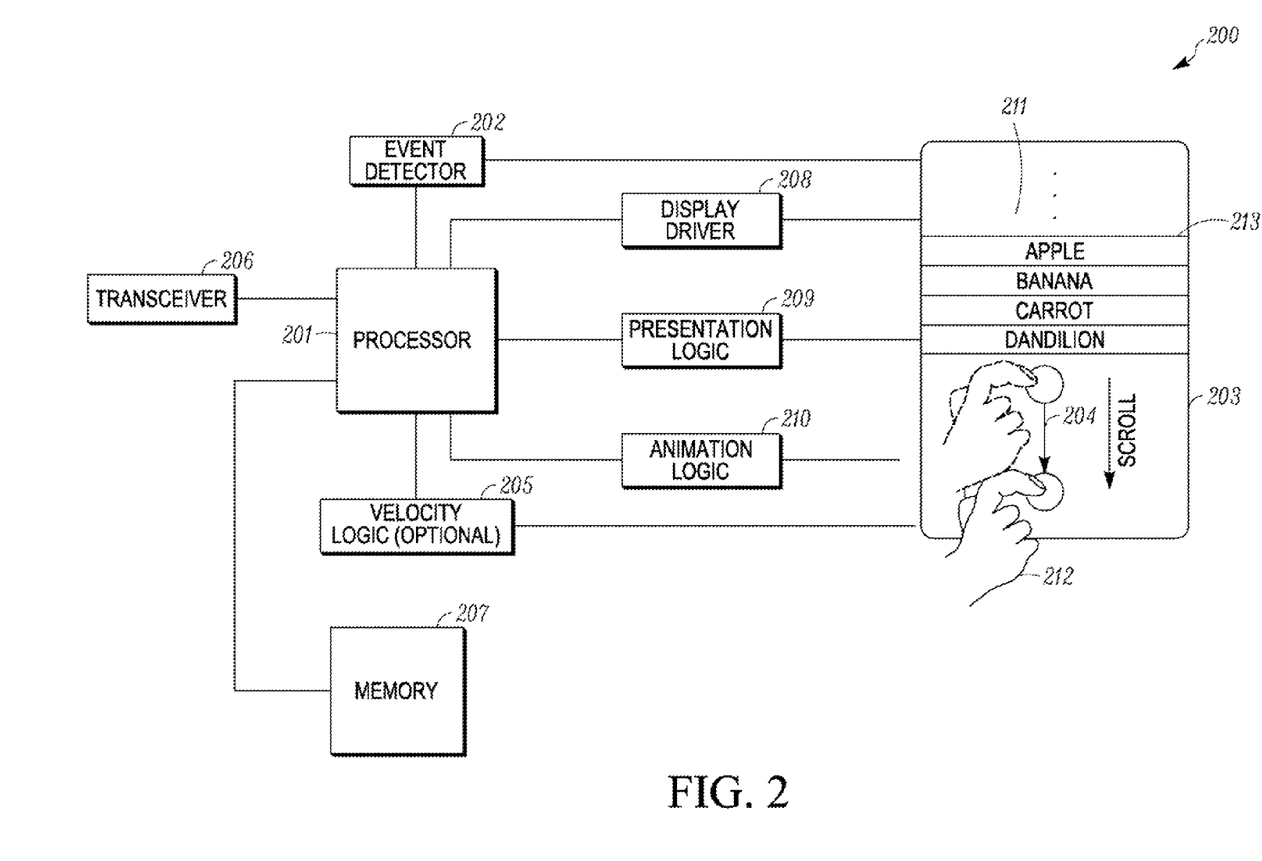
FIG. 2 illustrates an exploded view of one device configured in accordance with one or more embodiments of the invention.

Turning now to FIG. 2, illustrated therein is a block diagram of a circuit 200 suitable for use in altering the presentation of data elements on a display in accordance with one or more embodiments of the invention. While the embodiment of FIG. 1 was shown as residing in executable instructions, embodiments of the invention can equally be configured in hardware, such as with programmable logic, application specific integrated circuits, and so forth.

A processor 201 can be configured with the various circuits integrated therein, or alternatively may coordinate data flow between the various circuit components. An associated memory 207 may store software programs or the like used for the processing and controlling operations performed by the processor 201, or may temporarily store data, e.g., a phonebook, messages, still images, video, etc., that have been input by a user, or which are to be presented on a display 203. For example, the memory 207 can store a graphic user interface (GUI) program that contains the commands for presenting information on the display 203.

In one or more embodiments, the circuit 200 can include a transceiver 206. For example, where the circuit 200 is used in a mobile communication device, such as a mobile phone or smart phone, the transceiver 206 can be configured to transmit and receive data to and from a base station or network.

The display 203 is used for rendering information to a user 212. The display 203 can be configured to render a list 211 of items such as applications, contacts, emails, messages, picture thumbnails, media files, and so forth. The user 212 can then navigate through the list 211 and select or view data elements comprising the list.

In one or more embodiments, the data elements forming the displayed list 211 are each rendered within a field 213 on the display 203. Each field 213 can be configured with a certain height. For a list of N data elements, N fields 213 can be provided. Due to the size of the display and the height of the fields 213, at any one given time only X fields may be displayed on the display 203, where X is less than N. Thus, when there are more fields 213 in the list 211 than can be displayed at one time, the list 211 becomes "scrollable" by the user 212. The number of fields 213 and the height of each field can be determined by the processor 201 based on default settings or user preferred settings.

The user 212 can use touch sensitive capabilities (where present) of the display 203, keyboard commands, such as arrow keys or page-up and page-down keys, a scrollbar, or other device to change the display position of display area, i.e., to "scroll" through the list 211. Scrolling can occur on a line-by-line, page-by-page, or other basis. Based on detecting the user input for scrolling, the processor 201, with the assistance of a display driver 208 and presentation logic 209, moves the displayed list 211 in a corresponding direction 204, e.g., horizontally or vertically. The distance the list 211 moves each time the user initiates a scroll command can vary on user displacement, velocity of the scrolling operation, acceleration of the scrolling operation, combinations thereof, or other factors.

It should be noted that scrolling through the list 211 might also be implemented on a fixed-increment basis, such as line-by-line, page-by-page, and so forth. Page-by-page scrolling is commonly implemented using "page up" and "page down" keys. In scrolling operations, "page-by-page" typically refers to scrolling by approximately one screen area's amount of displayed content. Thus, scrolling down by one page causes the last line of the currently displayed portion to move to the top of the display area. For relatively small increments, most of the displayed portion of the document remains on the screen while a new portion is displayed. For example, a single line (or other small amount of the displayed content) may be removed from the top of the display window, while a new line (or other increment of new content) is introduced at the bottom of the display window.

An event detector 202 is configured to determine an event. As previously discussed, in one embodiment the event is a determination that a list is reaching an end of a scrolling operation. Examples of other events include the addition of a new data element, a rotation of the device, presentation of a virtual keyboard on the display, and so forth.

Animation logic 210 is configured to alter presentation of data elements in the list 211 by introducing a visible spatial separation between at least some of the fields 213 of adjacent data elements in response the event detector 202 detecting the event is about to occur. For example, when a list 211 is being scrolled on an incremental basis, such as field-by-field, the event detector 202 can be configured to check whether the last item of the list is being displayed, or is soon to be displayed, on the display 203. Where this event occurs or is soon to occur, the animation logic 210 can be configured to provide a visual clue to the user 212 that indicates the list 211 has, or is about to, reached its end. The visual clue in one embodiment is visible spatial separation between the fields 213.

In one embodiment, the visual clue is provided when the event occurs. For example, where the event is an end of list, the visual clue can be presented when the end of the list 211 is displayed. In another embodiment, the visual clue is presented in anticipation of the event, such as when the list 211 is about to reach its end. When the event occurs, the visual clue can be immediately removed, thereby returning the fields 213 to adjacency. Alternatively, the visual clue can be removed in accordance with a function of time after the event occurs to provide an aesthetically pleasing appearance to the user 212. Such a temporal function is referred to as a "settling function" and can result in each field 213 slowly moving back to adjacency. One illustrative purpose of the visual clue is to inform the user that they are seeing the top of the list 211 and cannot scroll any further up, or alternatively that they are seeing the bottom of the list 211 and cannot scroll any further down.

Optional velocity logic 295 can be configured to detect the velocity of the scrolling operation. Where used, the animation logic 210 can employ an output of the velocity logic to cause the visual clue to depend upon a scrolling speed of the scrolling operation as described above.

Figure 3:
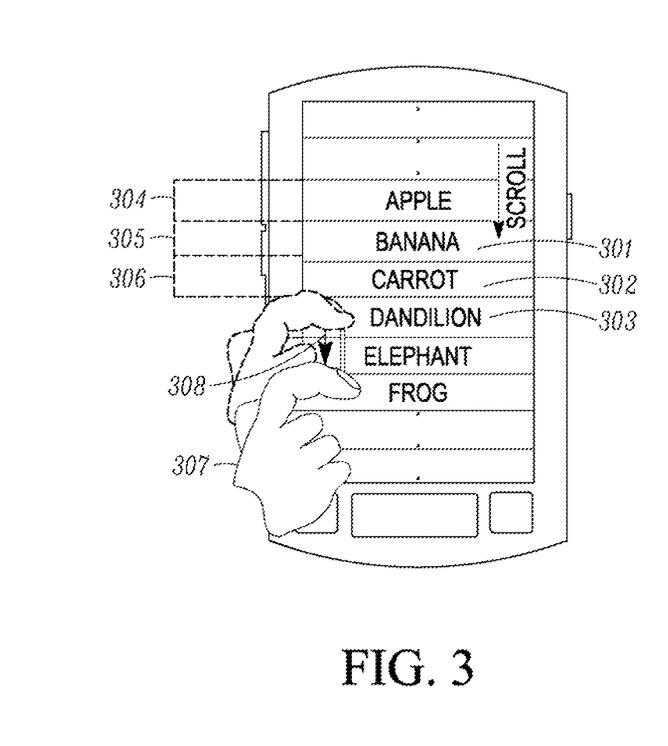
FIG. 3 illustrates one illustrative scrolling operation of a list of data elements in a device configured in accordance with one or more embodiments of the invention.
Figure 4:
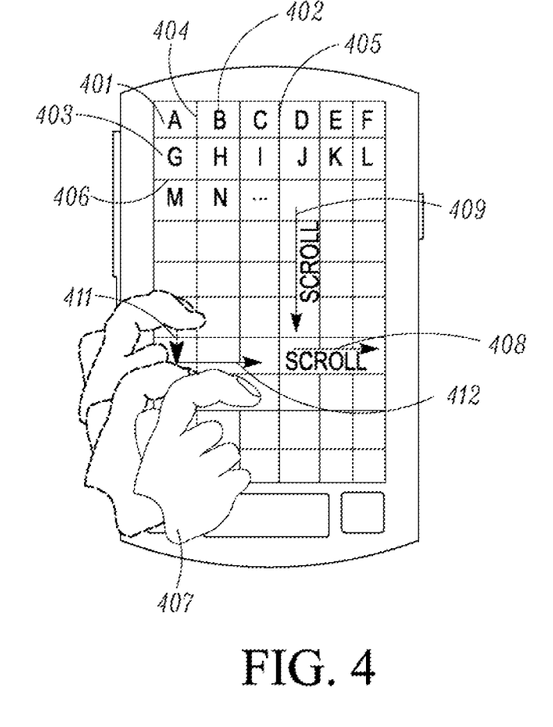
FIG. 4 illustrates one illustrative scrolling operation of a grid of data elements in a device configured in accordance with one or more embodiments of the invention.

FIGS. 3 and 4 each illustrate examples of data element presentation suitable with embodiments of the invention. In FIG. 3, a plurality of data elements 301,302,303 is shown in a linear list with corresponding data element fields 304,305, 306 being "stacked" in an adjacent relationship. For example, the data element field 304 of data element 301 is adjacent to the data element field 305 of data element 302, and so forth. In this configuration, a user 307 can manipulate and sort through the data elements 301,302,303 in a linear direction 308 associated with the orientation of the list stack. In FIG. 4, a plurality of data elements 401,402,403 are shown in a grid with corresponding data element fields 404,405,406 being adjacent in two linear directions 408,409. Accordingly, a user 407 can manipulate and sort through the data elements 401, 402,403 in multiple linear directions 410,411. Other arrangements can be used, such as the iconic arrangement that will be described with reference to FIG. 11 below.

Turning now to FIGS. 5-8, another example of an illustrative embodiment of the invention in operation will be shown.

FIGS. 5-8 represent a time-lapse sequence of display images, as indicated by the time stamps 500,600,700,800 present in each image.

Figure 5:
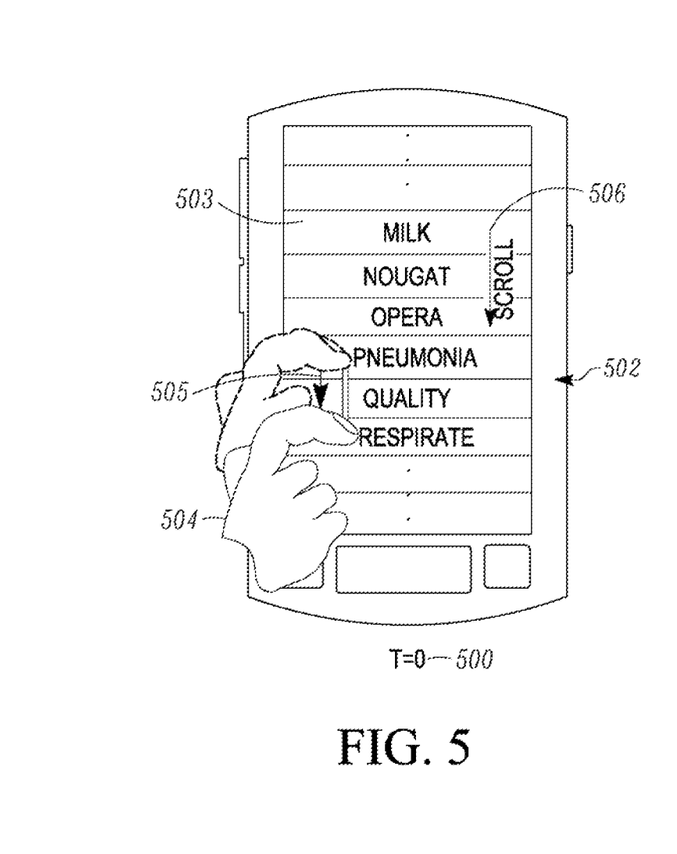
FIG. 5 illustrates an initiation of a scrolling operation in a list of data elements on a device configured in accordance with one or more embodiments of the invention.

Beginning with FIG. 5, a vertically displayed list 502 of data elements 503 is shown. In this example, each data element 503 is represented by a string of text characters present within a field. Alternatively, the data elements 503 could be any of text, graphics, or combinations thereof. The list 502 appears in FIG. 5 as it would before scrolling. A user 504 then executes a scrolling operation 505 by moving a finger downward. Accordingly, the list 502 begins to scroll 506 in the same direction. A processor executing operable code, a module, or other logic circuitry detects the scrolling operation 505.

The processor, module, or other logic circuitry then monitors the scrolling operation 505 to determine whether the list 502 has been scrolled all the way to an end of the list. In one embodiment, this occurs by determining that the first field having the first data element is displayed, or is about to be displayed, on the display. The processor, module, or other logic circuitry then provides a visual clue to indicate that there are no more items to be scrolled and that the user need not scroll further. The visual clue in this example is visible spatial separation between data elements.

Figure 6:
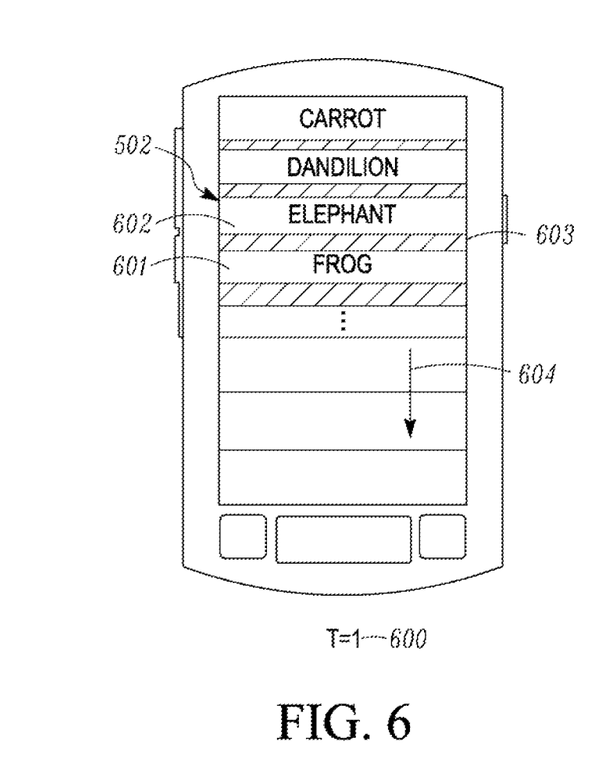
FIG. 6 illustrates the scrolling operation of FIG. 5 reaching an end of list condition.

As shown in FIG. 6, the processor, module, or other logic circuitry has determined that the list 502 is about to reach its end. Accordingly, the processor, module, or other logic circuitry begins to extend at least one data element 601 disposed towards the end of the list away from an adjacent data element 602 in a linear direction 604, thereby creating a visible spatial separation 603. While shown as black space in this illustrative example, the visible spatial separation 603 could be configured in a variety of ways, including with predetermined colors, patterns, and so forth. Note that the illustrative visible spatial separation 603 being introduced in FIG. 6 is descending.

Figure 7:
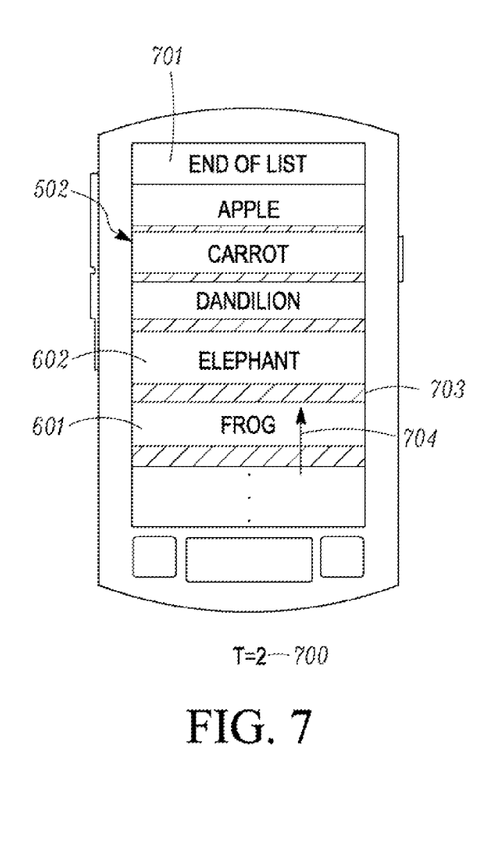
FIG. 7 illustrates the scrolling operation of FIG. 5 in an end of list condition.
Figure 8:
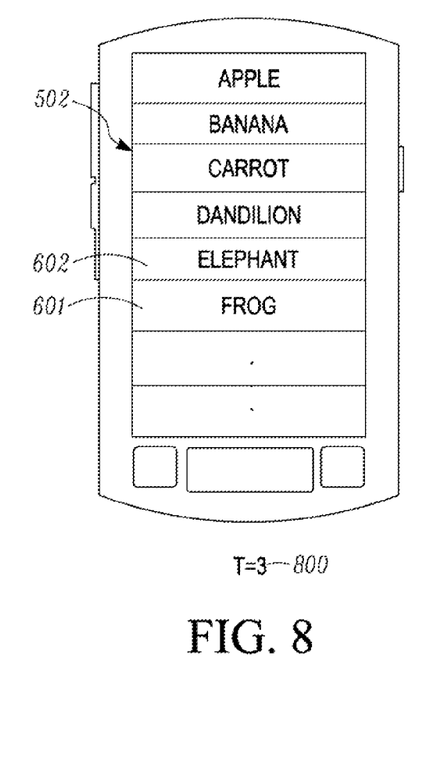
FIG. 8 illustrates the scrolling operation of FIG. 5 after an end of list condition has occurred.

As shown in FIG. 7, the list 502 has reached its end 701, with the end 701 of the list being presented on the display. Accordingly, the data elements 601,602 have been extended away from each other to a peak extension distance, thereby defining a maximum visible spatial separation area 703. When the processor, module, or other logic circuitry determines that data elements 601,602 have reached the peak extension distance away from each other, the processor, module, or other logic circuitry can begin retracting the data elements in a reverse linear direction 704 so as to again be adjacent. The result is shown in FIG. 8, where the list 502 is shown with adjacent data elements 601,602 shown in a state of adjacency.

The peak extension distance can be a predefined distance that defines the maximum linear extent up to which adjacent data elements 601,602 can be separated relative to each other. In one embodiment, the peak extension distance is determined based on the intensity of the scrolling operation. As noted above, the intensity of the scrolling operation can be measured, for example, in terms of velocity or acceleration of the scrolling operation. Accordingly, the peak extension distance can be configured to be proportional to the intensity of the scrolling operation. Once the data elements 601,602 are separated by a peak extension distance as shown in FIG. 7, they can be retracted to adjacency as shown in FIG. 8. As noted, extension and retraction can take a variety of animated forms. Adjacent data elements 601,602 can move away and towards each other so as to have the appearance of a spring or a ripple effect. Similarly, the data elements 601,602 can "snap" away from each other and "snap back" to adjacency.

In one or more embodiments, the extension of data elements 601,602 can comprise an extension of a predetermined quantity of data elements at the end of the list 502. For example, while the list 502 may have tens or hundreds of data elements, only a predetermined number, such as three or four, may be separated by the visible spatial separation 603. The predetermined number may be based upon the size of the display, the number of data elements that can be presented on the display, or other factors.

Figure 9:
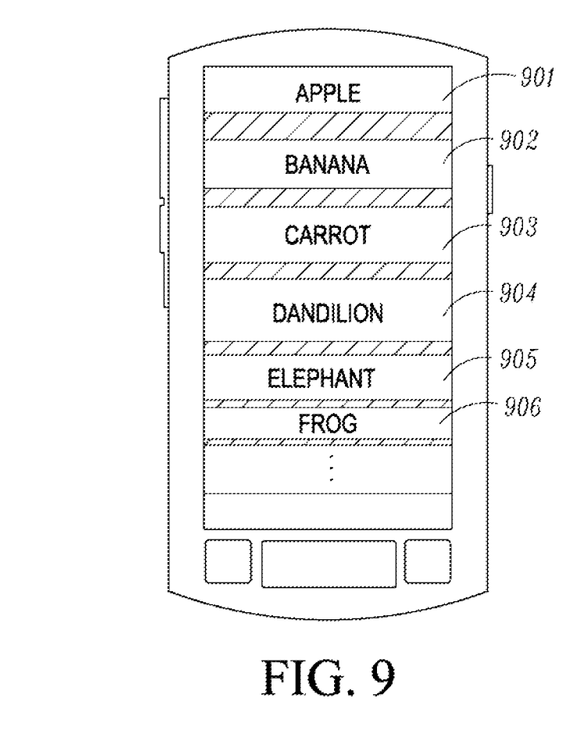
FIG. 9 illustrates a scrolling operation on a display of a device configured in accordance with one or more embodiments of the invention nearing and end of list condition, where visible spatial variation is configured opposite that shown in FIG. 6.

As noted above, the visible spatial separation 603 introduced can be configured in a variety of ways. Some of the examples to this point have been configured in a descending arrangement, where the visible spatial separation between the adjacent data elements is larger for data elements farther from the end of the list than for other data elements nearer the end of the list. However, embodiments described herein are not so limited. Turning to FIG. 9, illustrated therein is another example of the many configurations with which the visible spatial separation can be arranged.

While the visible spatial separation between data elements can be substantially equivalent, in one embodiment the visible spatial separation is determined in accordance with a predetermined separation function. This is the case in FIG. 9. In FIG. 9, a predetermined separation function has been used by the processor, circuitry, or module to cause the data elements 901,902,903,904,905,906 to be extended away from each other by different amounts. The visible spatial separation shown in FIG. 9 is "ascending" with the distance between adjacent data elements 901,902,903,904,905,906 being is smaller for data elements farther from the end of the list than for other data elements nearer the end of the list. As stated, this is but one example of the affect of employing a predetermined separation function. Other affects generated by other predetermined separation functions will be obvious to those of ordinary skill in the art having the benefit of this disclosure.

Figure 10:
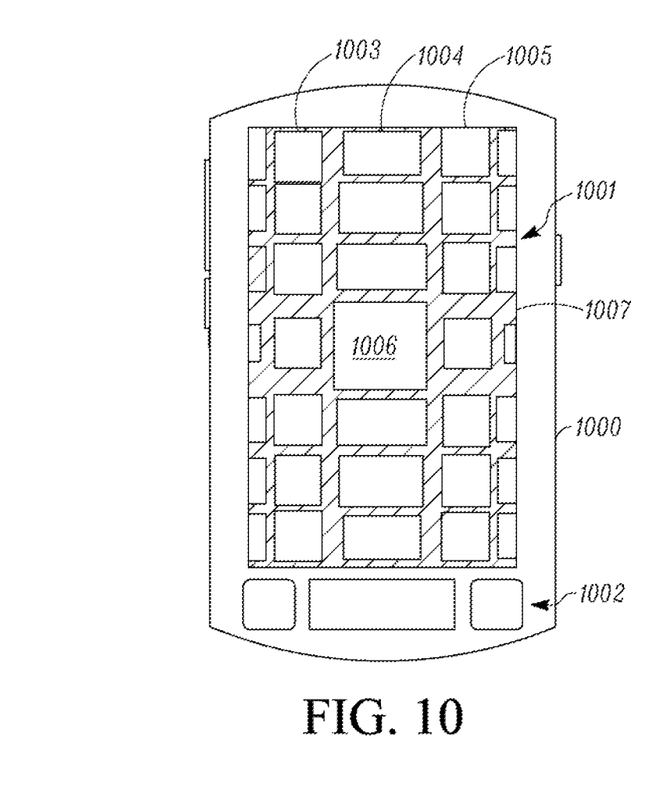
FIG. 10 illustrates a data element operation on a display of a device configured in accordance with one or more embodiments of the invention, where the data elements are presented in a grid format.

Turning now to FIG. 10, illustrated therein is an electronic device 1000 having a display 1001 and a user interface 1002. The user can employ the user interface 1002 to cause an event affecting the presentation of data elements 1003,1004,1005 on the display 1001. In this example, the display 1001 is configured as touch sensitive display, so the user can employ the display 1001 to cause an event affecting the presentation of data elements 1003,1004,1005 as well.

The display 1001 initially presented the data elements 1003,1004,1005 in a grid format, such as that shown in FIG. 4. However, in the view shown in FIG. 10, the user has employed the user interface 1002 to add a new data element. Specifically, data element 1006 is being added to the grid. A processor disposed within the electronic device 1000 is operable with an associated memory comprising instructions to cause the processor to detect the event. Accordingly, the processor detects that the user has initiated an add data element event.

In response to detecting the event, the processor has introduced spatial separation 1007 between the adjacent data elements. In this example, the spatial separation 1007 has been introduced in two dimensions, one vertical and one horizontal. The introduction of the spatial separation 1007 is a visible indicator to the user that the event is occurring. In this example, the processor has also altered the size of adjacent data elements. For example, data elements 1003,1005 are smaller than data element 1004. This provides the user with a three-dimensional visual clue. Once the necessary data has been added to data element 1006, the processor is configured to remove the spatial separation 1007. Said differently, once the event ends, the processor removes the spatial separation, returning the display 1001 to an appearance similar to that shown in FIG. 4.

Figure 11:
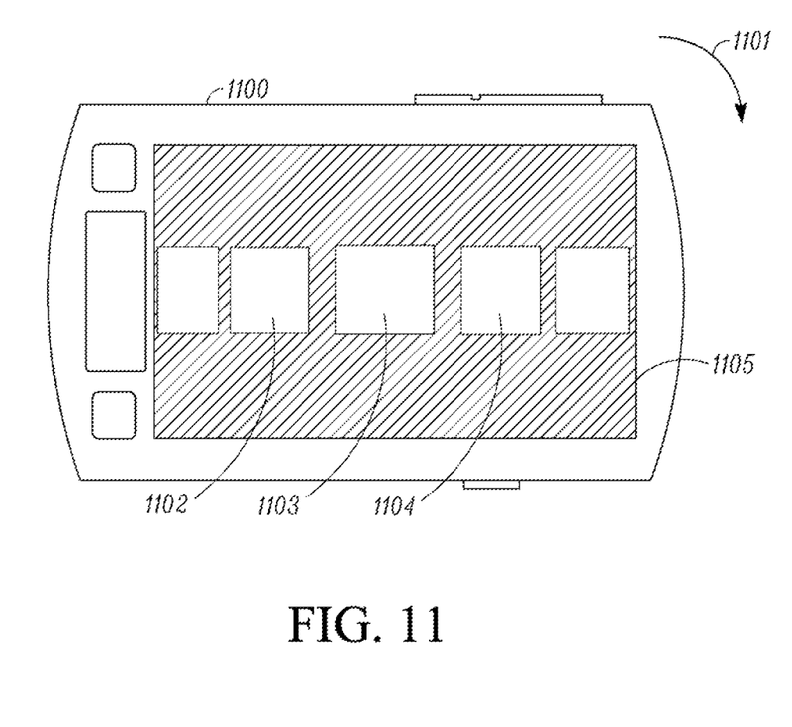
FIG. 11 illustrates a data element operation on a display of a device configured in accordance with one or more embodiments of the invention, where the data elements are presented in a landscape, iconic format.

Turning to FIG. 11, illustrated therein is another example of an event. In the illustrative embodiment of FIG. 11, the electronic device 1100 has been rotated 1101 from a portrait orientation similar to that shown in FIG. 3 to a landscape orientation. The operating system of the electronic device 1100 is configured to change a stacked list, also similar to that shown in FIG. 3, to a series of side-by-side icons 1102,1103, 1104. Since the rotation of the electronic device 1100 is the event, in response to detecting the event, the processor has introduced spatial separation 1105 between the adjacent icons 1102,1103,1104. Since the electronic device 1100 is now in the landscape position, i.e., since the event has ended, the processor can remove the spatial separation 1105 to return the icons 1102,1103,1104 to a state of adjacency.

Note that while the event in this example is a full rotation of the electronic device 1100, designers may opt to define events as variations of rotational amounts. For example, when the electronic device of FIG. 4 is rotated by a predetermined amount, say fifteen degrees, spatial separation such as that shown in FIG. 10 may be introduced. The spatial separation can be removed when the electronic device is rotated a corresponding amount in the opposite direction. Such a feature may be useful in gaming applications operable on the electronic device. Other event variations will be obvious to those of ordinary skill in the art having the benefit of this disclosure.

Figure 12:
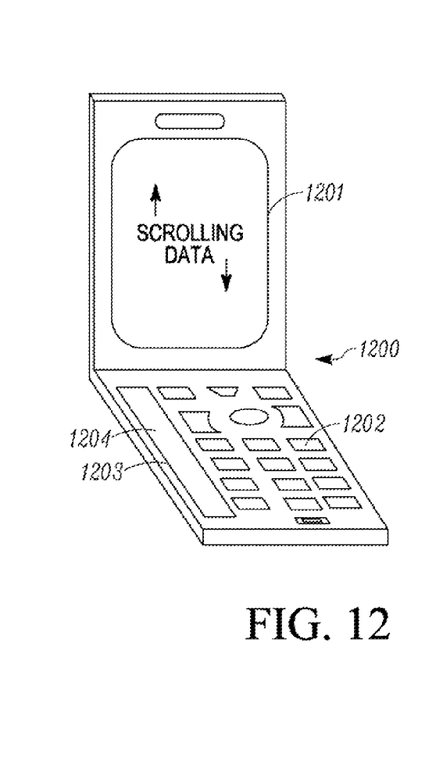
FIGS. 12-14 illustrate alternate devices suitable for use with one or more embodiments of the invention.

Turning now to FIG. 12, illustrated therein is an alternate electronic device 1200 suitable for use with embodiments of the invention. FIG. 12 is included because many embodiments of the invention described above have included touch-sensitive displays. However, as noted above, embodiments of the invention are not so limited. In the illustrative embodiment of FIG. 12, the user interface includes a display 1201 for presenting data elements to a user. The data elements may be rendered on the display 1201 in any of a list rendering, an adjacent icon rendering, or a grid rendering. Additionally, the data elements may include text, graphics, or combinations thereof.

The illustrative electronic device 1200 of FIG. 12 also includes a keypad 1202 and a slider bar 1203. The keypad 1202 and slider bar 1203 are configured to receive input from a user. Specifically, the user may employ the slider bar 1203 to effect scrolling or data presentation alteration in accordance with embodiments described above, rather than using a touch sensitive display. The slider bar 1203 may be configured as a touch sensitive pressure pad, or it may be configured as a non-touch sensitive mechanical device such as a lever or mechanically sliding switch. Where the slider bar 1203 is configured as a touch sensitive pressure pad for example, a user may place a finger at the center 1204 of the slider bar 1203 initially, and may slide the finger up or down to scroll data accordingly. Visible spatial separation can be introduced at an end of list event as described above.

Figure 13:
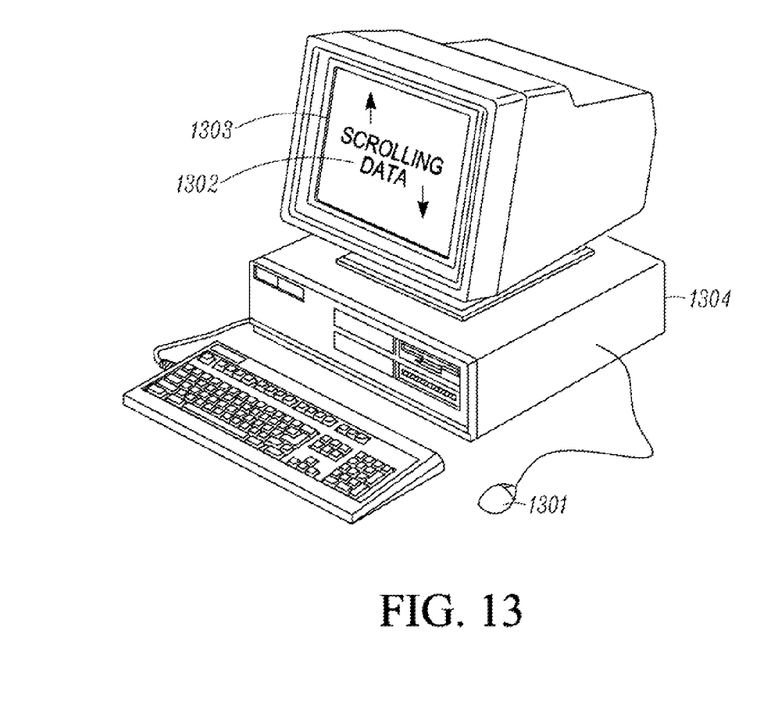
Figure 14:
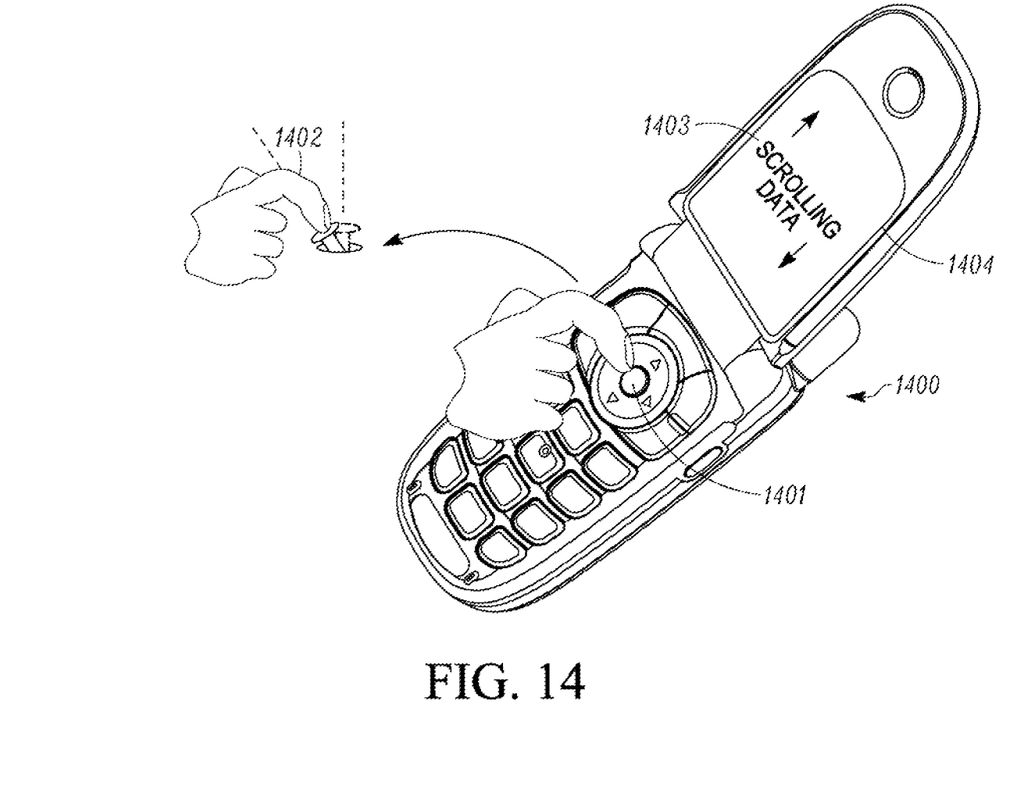

Similarly, turning now to FIG. 13, embodiments of the invention can be used with other user interfaces. In FIG. 13, the user interface is a mouse 1301. The mouse 1301 is actuated when the user clicks a button on the mouse. The mouse 1301 can then be deflected by moving the mouse 1301 along a surface, which results in a net deflection from the position the mouse 1301 was in when the button was clicked. In accordance with one or more embodiments of the invention, a control circuit then executes code comprising one or more routines stored in the memory to alter the presentation of data 1302 by causing the data 1302 to scroll along the display 1303 of a computer 1304. Visible spatial separation can be introduced at an end of list event as described above. Velocity and other information can be detected and used for introducing visible spatial separation as well, as in one embodiment the farther the user moves the mouse 1301 while depressing the button, the faster the data 1302 scrolls. Once the mouse button is released, the scrolling process stops.

Turning to FIG. 14, illustrated therein is an alternate embodiment of an electronic device 1400 suitable for use with embodiments of the invention. As noted above, data can be manipulated, and events caused, by manipulation of non-touch sensitive user interfaces such as mouse devices, infrared pointers, joysticks, pressure pads, and the like. FIG. 14 illustrates an electronic device 1400 that includes a joystick 1401.

In the illustrative embodiment of FIG. 12, the joystick 1401 is actuated by the user by placing a finger 1402 on an interface of the joystick 1401 and deflecting the interface by a certain deflection from a neutral position. A control circuit executes code comprising one or more routines stored in the memory to alter the presentation of data 1403 by causing the data 1403 to scroll along the display 1404. Visible spatial separation can be introduced at an end of list event as described above. Velocity and other information can be detected and used for introducing visible spatial separation as well, as in one embodiment the farther the user moves the finger 1402 to deflect the joystick 1401 from the neutral position, the faster the data 1403 scrolls. Once the joystick 1401 is returned to the neutral position, the scrolling process stops.

Figure 15:
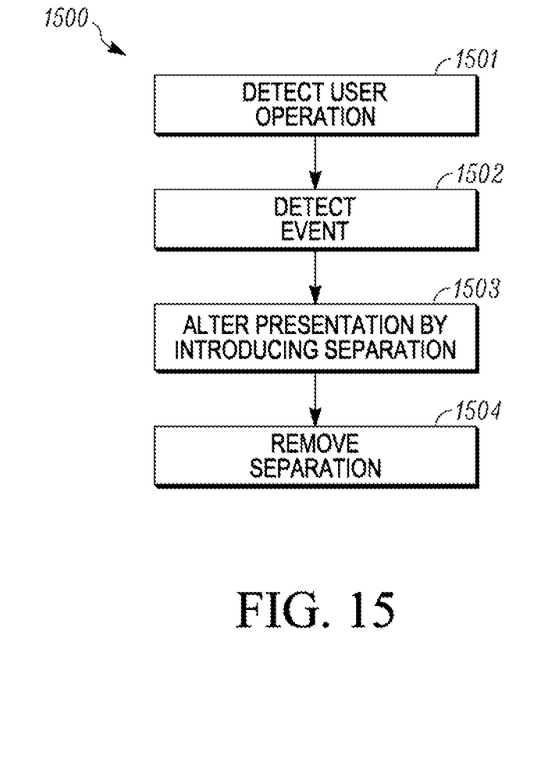
FIG. 15 illustrates a method configured in accordance with one or more embodiments of the invention.

Turning now to FIG. 15, illustrated therein is a flowchart depicting a method 1500 for altering the presentation of a plurality of data elements on the display of an electronic device. As described above, at step 1501a device detects user activity. In one or more embodiments, the user activity will lead to the occurrence of an event. For example, where the user activity is a scrolling operation, the event may be an end of list occurrence during the scrolling operation.

At step 1502, the device detects the occurrence of an event. Examples of events include an end of list status of a scrolling operation, adding a new data element to a plurality of data elements, presentation of a virtual keyboard on a display, rotating the device, and so forth. Accordingly, in one embodiment step 1502 comprises determining a list is reaching an end during the scrolling operation.

At step 1503, in response to detecting the event at step 1502, the device alters the presentation of data elements on the display by introducing a visible spatial separation between at least some of the plurality of data elements. In one embodiment, the presentation is altered by initiating an animation configured to move the at least some of the data elements from being adjacent to being separated by a peak extension length across a predefined time leading to the event occurring. In another embodiment, the presentation is altered by introducing visible spatial separation between at least some adjacent data elements. For instance, the device may extend at least one data element at the end of the list away from an adjacent data element in a linear direction. The amount of visible spatial separation may differ between different elements. Additionally, the visible spatial separation may be introduced in one direction or multiple directions. The visible spatial separation may coincide with alteration of the size or appearance of the data elements as well.

At step 1504, the device removes the visible spatial separation after the event occurs. In one embodiment, step 1504 comprises retracting the one data element in a reverse direction so as to again be adjacent with an adjacent data element in a list.

In accordance with embodiments described above, the present invention optimizes all of the constraints presented in the problem statement. The implementation of the present invention provides enhanced data manipulation experience to a user by providing visual clues that inform the user when events are occurring.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method comprising:
    displaying, at a display of an electronic device, an arrangement of a plurality of data elements;
    while performing an operation for adding a new element to the plurality of data elements, animating, with one or more processors of the electronic device and at the display, a visible increase in a spatial separation between at least some of the plurality of data elements by at least:
        determining, based on a half sine wave, an amount of the spatial separation between a pair of the at least some of the plurality of data elements; and
        increasing, based on the amount, the spatial separation between the pair; and
    after performing the operation for adding the new element to the plurality of data elements, removing, with the one or more processors, based on a settling function and from the display, the visible increase in the spatial separation.

2. The method of claim 1, wherein the pair of the at least one of the plurality of data elements comprises a first pair of the at least one of the plurality of data elements and a second pair of the at least one of the plurality of data elements and animating the visible increase in the spatial separation between the at least some of the plurality of data elements comprises:
    increasing, a first amount of the spatial separation between the first pair of the at least some of the plurality of data elements; and
    increasing, a second amount of spatial separation between the second pair of the at least some of the plurality of data elements, wherein the first amount differs from the second amount.

3. The method of claim 1, wherein animating the visible increase in the spatial separation between the at least some of the plurality of data elements comprises:
    increasing, during a predefined amount of time before the operation for adding the new element is complete, the spatial separation between the pair of the at least some of the plurality of data elements such that the pair of elements is separated by a peak extension length after the predefined amount of time.

4. The method of claim 1, wherein animating the visible increase in the spatial separation between the at least some of the plurality of data elements comprises increasing, based on respective positions of the pair of the at least some of the plurality of data elements in a grid, the amount of the spatial separation between the pair.

5. The method of claim 1, wherein each of the data elements from the plurality of data elements are respective graphical icons of individual videos data stored at a memory of the electronic device.

6. The method of claim 1, wherein the arrangement of the plurality of data elements is either a list arrangement or a grid arrangement.

7. The method of claim 1, wherein the visible increase in the spatial separation between the at least some of the plurality of data elements is an increase in the horizontal, spatial separation between the at least some of the plurality of data elements.

8. The method of claim 1, wherein the visible increase in the spatial separation between the at least some of the plurality of data elements is an increase in the vertical, spatial separation between the at least some of the plurality of data elements.

9. The method of claim 1, wherein animating the visible increase in the spatial separation between the at least some of the plurality of data elements comprises:
    determining an amount of time to finish performing the operation for adding the new element to the plurality of data elements; and
    completing animating, during the amount of time, the visible increase.

10. An electronic device comprising:
    a display configured to present an arrangement of a plurality of data elements;
    a processor; and
    at least one module operable by the processor to:
        perform an operation for adding a new element to the plurality of data elements; and
        while performing the operation, animate, at the display, a visible increase in spatial separation between at least some of the plurality of data elements by at least:
            determining, based on a half sine wave, an amount of the spatial separation between a pair of the at least some of the plurality of data elements; and
            increasing, based on the amount, the spatial separation between the pair; and
        after performing the operation, remove, based on a settling function and from the display, the visible increase in the spatial separation.

11. The electronic device of claim 10, wherein the pair of the at least one of the plurality of data elements comprises a first pair of the at least one of the plurality of data elements and a second pair of the at least one of the plurality of data elements and the at least one module is further operable by the processor to animate the visible increase in the spatial separation between the at least some of the plurality of data elements by at least:
    increasing, a first amount of the spatial separation between the first pair of the at least some of the plurality of data elements; and
    increasing, a second amount of spatial separation between the second pair of the at least some of the plurality of data elements, wherein the first amount differs from the second amount.

12. The electronic device of claim 10, wherein the at least one module is further operable by the processor to animate the visible increase in the spatial separation between the at least some of the plurality of data elements by at least:

increasing, during a predefined amount of time before the operation for adding the new element is complete, the spatial separation between the pair of the at least some of the plurality of data elements such that the pair of elements is separated by a peak extension length after the predefined amount of time.

13. The electronic device of claim 10, wherein the at least one module is further operable by the processor to animate the visible increase in the spatial separation between the at least some of the plurality of data elements by at least increasing, based on respective positions of the pair of the at least some of the plurality of data elements in a grid, the amount of the spatial separation between the pair.

14. The electronic device of claim 10, further comprising a memory, wherein each of the data elements from the plurality of data elements are respective graphical icons of individual entries of an address book stored at the memory.

15. The electronic device of claim 10, wherein the arrangement of the plurality of data elements is either a list arrangement or a grid arrangement.

16. The electronic device of claim 10, wherein the visible increase in the spatial separation between the at least some of the plurality of data elements is an increase in the horizontal, spatial separation between the at least some of the plurality of data elements.

17. The electronic device of claim 10, wherein the visible increase in the spatial separation between the at least some of the plurality of data elements is an increase in the vertical, spatial separation between the at least some of the plurality of data elements.

18. The electronic device of claim 10, wherein the at least one module is further operable by the processor to animate the visible increase in the spatial separation between the at least some of the plurality of data elements by at least:

determining an amount of time to finish performing the operation for adding the new element to the plurality of data elements; and completing animating, during the amount of time, the visible increase.

* * * * *